(12) United States Patent     (10) Patent No.:   US 12,682,217 B2

Shetty                (45) Date of Patent:      Jul. 14, 2026

(54) ARTIFICIAL INTELLIGENCE AGENT OUTPUT THROUGH CACHING PREDICTED INPUTS

(71) Applicant: Airia LLC, Alpharetta, GA (US)

(72) Inventor: Rohit Pradeep Shetty, Bangalore (IN)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/529,578

(22) Filed: Feb. 4, 2026

(65) Prior Publication Data

US 2026/0170306 A1     Jun. 18, 2026

Related U.S. Application Data

(63) Continuation of application No. 19/178,847, filed on Apr. 14, 2025, which is a continuation of application No. 18/946,889, filed on Nov. 13, 2024, now Pat. No. 12,277,489.

(51) Int. Cl.
     *G06N 3/0455*       (2023.01)

(52) U.S. Cl.
     CPC .................................. *G06N 3/0455* (2023.01)

(58) Field of Classification Search
     CPC .................................................... G06N 3/0455
     USPC ........................................ 706/21, 16, 17, 18
     See application file for complete search history.

(56) References Cited

U.S. PATENT DOCUMENTS

| | | | |
|---|---|---|---|
| 11,321,527 B1 | 5/2022 | Gopalarao et al. | |
| 11,995,411 B1 * | 5/2024 | Qadrud-Din ........... | G06N 3/045 |
| 12,541,493 B1 * | 2/2026 | Gupta ................ | G06F 16/2237 |
| 2022/0366294 A1 | 11/2022 | Sivakumar et al. | |
| 2023/0401332 A1 | 12/2023 | Vahidnia et al. | |
| 2023/0409756 A1 | 12/2023 | Baldwin et al. | |
| 2024/0104239 A1 | 3/2024 | Maor et al. | |
| 2024/0211504 A1 | 6/2024 | Jeong et al. | |
| 2024/0256582 A1 | 8/2024 | Jain et al. | |
| 2024/0345551 A1 | 10/2024 | Ramanasankaran et al. | |
| 2024/0403341 A1 * | 12/2024 | Berglund ............ | G06F 16/3326 |

FOREIGN PATENT DOCUMENTS

| | | |
|---|---|---|
| CN | 118069815 A | 5/2024 |

* cited by examiner

*Primary Examiner* — Juan A Torres

(74) *Attorney, Agent, or Firm* — Clayton, McKay & Bailey, PC

(57) ABSTRACT

The present invention provides a system for processing user queries through an artificial intelligence ("AI") pipeline, utilizing data chunking, question generation, and AI models to deliver contextually relevant responses. The system includes a server that ingests and chunks datasets, generates vector embeddings, and stores the data in one or more vector databases. An execution engine sends the chunked data to an AI model that generates potential questions tailored to different user personas. These questions, along with their corresponding data chunks, are stored in the database for future retrieval. When a user submits a query, the system semantically compares the query to the pre-generated question vectors and retrieves the most relevant question and associated data chunk. The query is then sent to an external AI model for final response generation. The system provides seamless interaction, delivering optimized, context-aware responses to user queries in real-time.

20 Claims, 9 Drawing Sheets

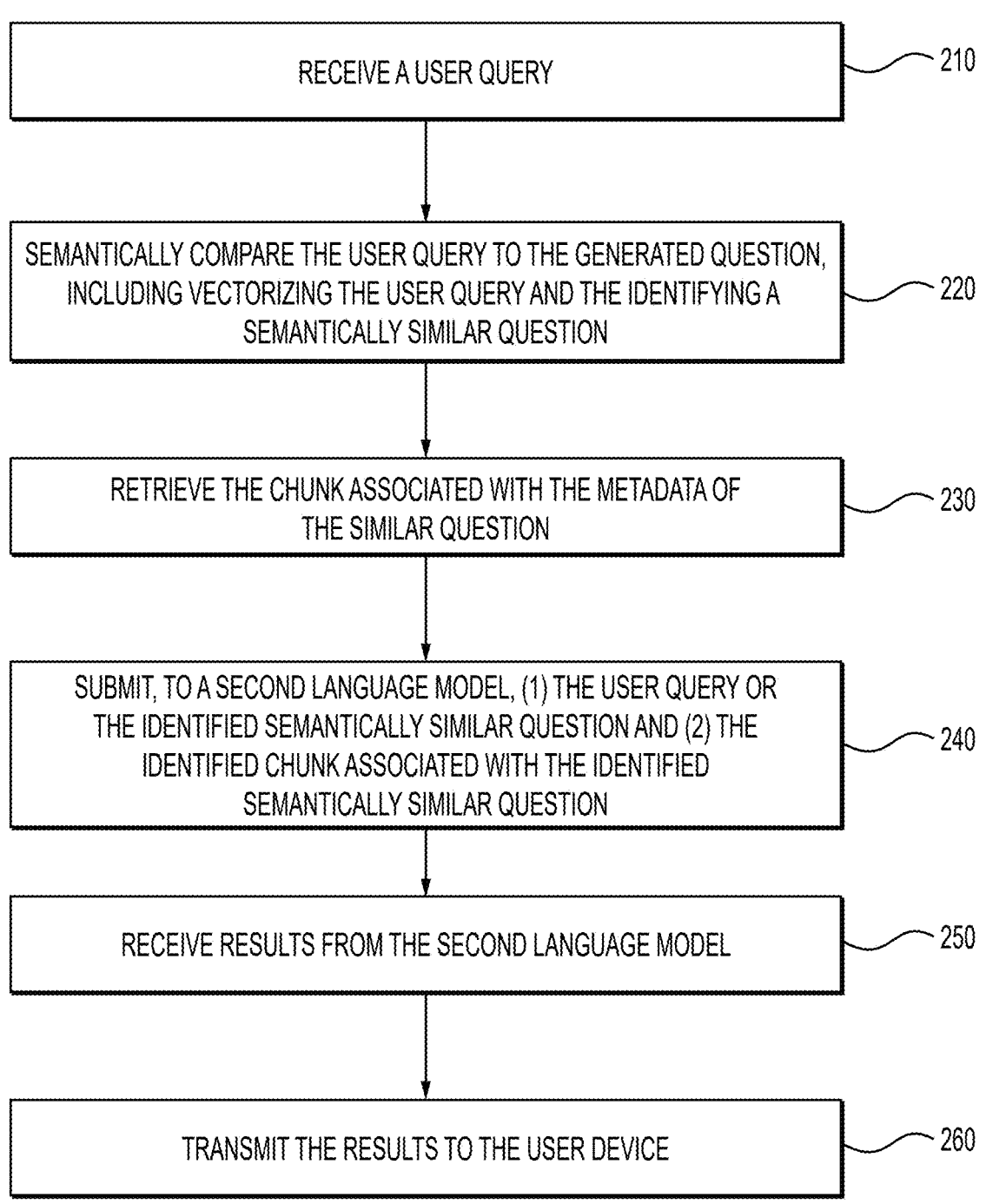

RECEIVE A USER QUERY — 210

SEMANTICALLY COMPARE THE USER QUERY TO THE GENERATED QUESTION, INCLUDING VECTORIZING THE USER QUERY AND THE IDENTIFYING A SEMANTICALLY SIMILAR QUESTION — 220

RETRIEVE THE CHUNK ASSOCIATED WITH THE METADATA OF THE SIMILAR QUESTION — 230

SUBMIT, TO A SECOND LANGUAGE MODEL, (1) THE USER QUERY OR THE IDENTIFIED SEMANTICALLY SIMILAR QUESTION AND (2) THE IDENTIFIED CHUNK ASSOCIATED WITH THE IDENTIFIED SEMANTICALLY SIMILAR QUESTION — 240

RECEIVE RESULTS FROM THE SECOND LANGUAGE MODEL — 250

TRANSMIT THE RESULTS TO THE USER DEVICE — 260

*FIG. 2*

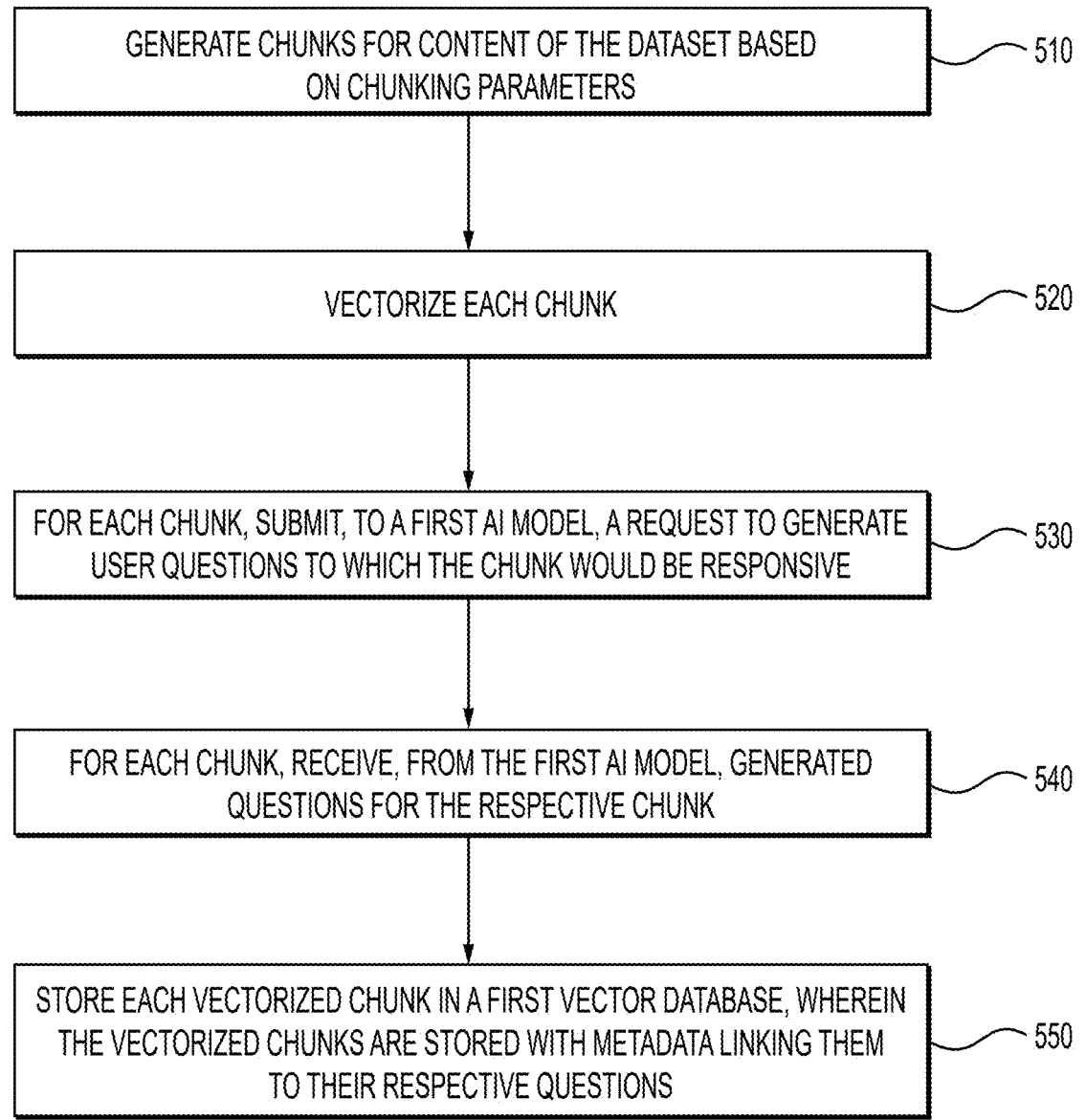

GENERATE CHUNKS FOR CONTENT OF THE DATASET BASED ON CHUNKING PARAMETERS ～510

VECTORIZE EACH CHUNK ～520

FOR EACH CHUNK, SUBMIT, TO A FIRST AI MODEL, A REQUEST TO GENERATE USER QUESTIONS TO WHICH THE CHUNK WOULD BE RESPONSIVE ～530

FOR EACH CHUNK, RECEIVE, FROM THE FIRST AI MODEL, GENERATED QUESTIONS FOR THE RESPECTIVE CHUNK ～540

STORE EACH VECTORIZED CHUNK IN A FIRST VECTOR DATABASE, WHEREIN THE VECTORIZED CHUNKS ARE STORED WITH METADATA LINKING THEM TO THEIR RESPECTIVE QUESTIONS ～550

*FIG. 5*

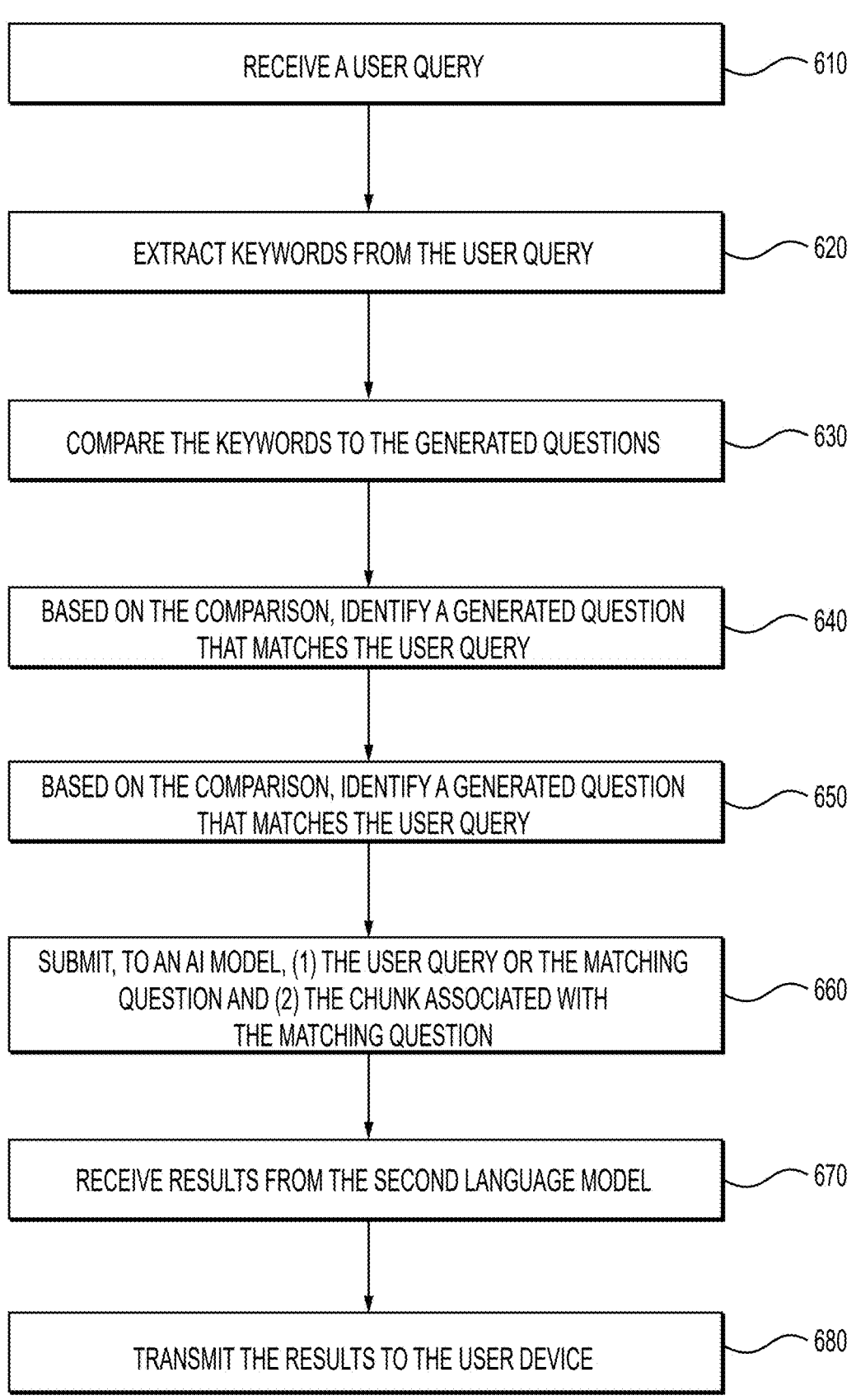

RECEIVE A USER QUERY — 610

EXTRACT KEYWORDS FROM THE USER QUERY — 620

COMPARE THE KEYWORDS TO THE GENERATED QUESTIONS — 630

BASED ON THE COMPARISON, IDENTIFY A GENERATED QUESTION THAT MATCHES THE USER QUERY — 640

BASED ON THE COMPARISON, IDENTIFY A GENERATED QUESTION THAT MATCHES THE USER QUERY — 650

SUBMIT, TO AN AI MODEL, (1) THE USER QUERY OR THE MATCHING QUESTION AND (2) THE CHUNK ASSOCIATED WITH THE MATCHING QUESTION — 660

RECEIVE RESULTS FROM THE SECOND LANGUAGE MODEL — 670

TRANSMIT THE RESULTS TO THE USER DEVICE — 680

*FIG. 6*

ARTIFICIAL INTELLIGENCE AGENT OUTPUT THROUGH CACHING PREDICTED INPUTS

This application claims priority as a continuation of U.S. patent application Ser. No. 19/178,847, titled "Improved Artificial Intelligence Agent Output Through Caching Predicted Inputs," filed on Apr. 14, 2025, which claims priority as a continuation of U.S. Pat. No. 12,277,489, titled "Improved Artificial Intelligence Agent Output Through Caching Predicted Inputs" and filed on Nov. 13, 2024, each of which are incorporated herein in their entirety.

BACKGROUND

Artificial intelligence ("AI") agents, such as AI pipelines, have become increasingly popular in a wide range of applications, from natural language processing to image recognition. These AI agents often rely on datasets, allowing the AI system to generate responses based on datasets of interest to the user. However, users tend to frequently ask similar or repetitive questions based on the dataset. This behavior is particularly common in systems designed to handle general inquiries or provide responses to a set of predefined information.

The frequent repetition of similar queries or other types of inputs results in unnecessary processing within the AI agent. Each time a similar input is received, the system must reprocess the input and generate a response, which can include executing multiple agent objects, such as a vector search of the dataset and an AI service to analyze or format the results of the vector search. This can consume computing resources such as memory, central processing unit ("CPU") cycles, and token usage, all to arrive at the same result as for prior inputs. In systems that operate with a token-based architecture, where responses are metered by the number of tokens processed, this repetitive query behavior leads to inefficient use of available tokens, ultimately reducing the system's overall effectiveness.

In particular, the problem is exacerbated in AI agents that charge users based on the number of tokens consumed during interactions. When multiple users repeatedly ask similar questions or submit the same input, the AI model unnecessarily uses tokens for responses that have already been processed, leading to excess resource consumption and inflated costs. This situation not only wastes computational resources but also introduces latency in the system's responses, potentially degrading the user experience.

Additionally, some user queries may not semantically match appropriate content in a vector database search. Currently, no scalable method exists for anticipating this issue ahead of time. Instead, the user is left having to rephrase their query until they get adequate results. This is costly in both time and processing, since the same AI agent will need to execute repeatedly until the user finally receives adequate results.

There is, therefore, a need for a solution that can reduce the computational overhead associated with handling repetitive queries in AI agents, optimize the usage of tokens, and improve the overall efficiency of the system.

SUMMARY

Examples described herein include systems and methods for processing user queries in an AI agent, utilizing a combination of data chunking, vector embeddings, pre-generated questions, and third-party AI models to provide accurate, context-aware responses. The system is designed to manage large datasets by segmenting them into smaller, coherent chunks, generating potential user questions about those chunks, and storing both the chunked data and questions in a vectorized form for efficient retrieval. The system also supports user queries by semantically matching user input to pre-generated questions and sending the corresponding data chunk to an AI model for final response generation. This process ensures that users receive tailored, relevant answers based on the content of the dataset, improving the accuracy and efficiency of query handling. Semantically matching the pre-generated questions can be more accurate than attempting to directly semantically match a query against responsive content. In this way, additional intelligence can be built in up front before the query is even received by the user, such that the query is linked to a pre-generated question, which in turn is linked to one or more responsive data chunks.

The system can begin with the ingestion of a dataset by an AI agent execution engine on a server, which processes the dataset by dividing it into smaller, meaningful segments referred to as "chunks." The execution engine can include one or more processes executing on one or more servers of the AI platform and is referred to herein as an AI agent engine as well. The execution engine uses predefined chunking rules, such as token limits or semantic boundaries, to ensure each chunk represents a coherent unit of data. An embedding model is then applied to these chunks, generating vector embeddings that capture the semantic relationships within the data. These vectors, along with metadata, are stored in a vector database for subsequent retrieval and use.

Once the data has been chunked and vectorized, an execution engine sends each chunk to a query AI model, which is responsible for generating questions that various user types might ask about the content. These questions can be tailored to different personas, such as technical users, support users, or end users, ensuring that the system anticipates a wide range of possible queries. The generated questions are then vectorized and stored in the same or a separate vector database, along with their corresponding data chunks. This preemptive generation of questions enables faster response times during actual user interactions, as the system can match user queries with pre-generated content rather than generating responses on the fly.

Metadata can be stored as one or more fields in a file and not be visually apparent. However, the metadata can also include an agent execution instruction that causes the execution engine to perform a keyword or semantic search of some other source, such as the internet, to identify additional metadata content for that chunk. For example, the execution engine could search for recent terms that mean the same thing as a term in the metadata. These recent terms could then be applied to the keyword search. Alternatively, the metadata can include a pointer that directs the execution engine to the recent keywords. This can help ensure contextual relevancy of chunks that were not recently ingested.

When a user submits a query through an application interface on their device, the query is sent to the AI agent via an endpoint, where it is processed by the execution engine. The execution engine vectorizes the user input and compares it semantically to the vectorized pre-generated questions stored in the database. Using techniques like cosine similarity or other distance metrics, the system identifies the closest match between the user's query and the pre-generated questions. Once a match is found, the execution engine retrieves the corresponding data chunk associated with that question.

After retrieving the matching question and data chunk, the execution engine sends this information to an AI model. The AI model processes the input, using the question and chunk as context, and generates a detailed, contextually relevant response. The response is then sent back to the execution engine on the server, which forwards it to the application on the user's device for display. This seamless integration between the server, the AI agent, and external AI models allows the system to deliver high-quality responses in real-time, optimizing the user experience while maintaining flexibility and scalability.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 2 is a flowchart of an example method for matching a query input to a pre-generated question for an AI agent.

FIG. 5 is a flowchart of another example method for identifying and caching potential queries of an AI agent.

FIG. 6 is a flowchart of another example method for matching a query input to a pre-generated question for an AI agent.

DESCRIPTION OF THE EXAMPLES

Figure 1:
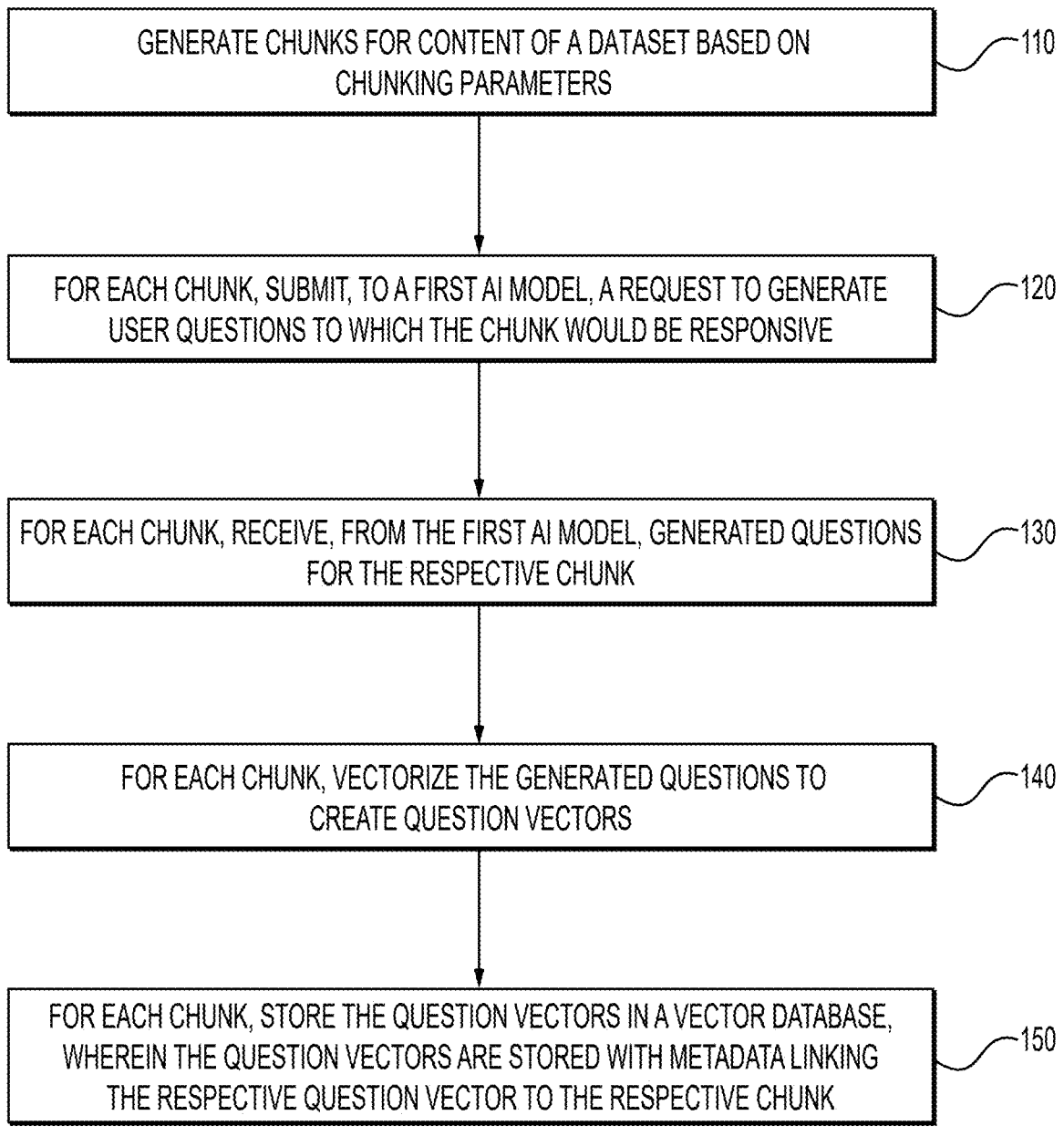
FIG. 1 is a flowchart of an example method for identifying and caching potential queries of an AI agent.

Reference will now be made in detail to the present examples, including examples illustrated in the accompanying drawings. Wherever possible, the same reference numbers will be used throughout the drawings to refer to the same or like parts.

The present invention provides a system for generating and storing anticipated user questions within an AI agent. After a dataset is ingested and chunked by an execution engine, each chunk is processed by a query AI model that generates potential questions tailored to different user personas, such as technical users, support staff, or end users. These questions, along with their corresponding data chunks, are vectorized using an embedding model to capture their semantic meaning. The vectorized questions and associated chunks are then stored in one or more vector databases, allowing for efficient retrieval during future query processing. By preemptively generating questions, the system can anticipate a wide range of user queries and enhance the speed and relevance of responses.

When a user submits a query through an application interface, the system processes it by vectorizing the input and semantically comparing it to the pre-generated question vectors stored in the database. Using similarity metrics, the execution engine identifies the most relevant question and retrieves the associated data chunk. The matched question and chunk are then sent to an AI model for further processing and generation of a detailed response. This response is returned to the execution engine, which forwards it to the user's device for display. The system ensures that user queries are handled quickly and accurately by leveraging pre-generated questions and semantic matching, providing contextually appropriate answers based on the content of the dataset.

Additionally, an AI agent can be components that communicate across disparate systems. The AI agent can include an orchestrator that distributes communications to communicators. An orchestrator can include an execution engine and rules engine, and maintain order based on an AI agent manifest. The combination of an orchestrator plus a communicator can collectively act as an assistant for an AI-powered workflow. In some contexts, the AI-powered workflow is referred to as an AI agent. Alternatively, the AI agents can include the communicators, and the pipeline can include the orchestrator plus pipeline objects.

The communicator can include a management controller or a third-party services controller. The communicator can have an API used for taking actions according to pipeline objects on an AI agent. A token can be used to authenticate a user or the AI platform with the communicator and ensure that the user or AI platform have proper management privileges for actions available at the API. Alternatively, instead of an API, third party services can add a plugin for use as a management controller. The plugin can include code that allows for running processes within the third-party application. The processes can control aspects of the application that the user has the required privileges to control.

FIG. 1 is a flowchart of an example method for identifying and caching potential queries of an AI agent. The stages can be performed by an execution engine or at the behest of the execution engine. The execution engine can execute as one or more processes on one or more hardware servers. The execution engine can create questions for data chunks from a dataset of an AI agent.

At stage 110, an execution engine can generate chunks for content of a dataset based on an embedding model and chunking parameters. The dataset serves as reference material or a knowledge base for an AI model. A user can input a query into the AI agent, such as asking about a specific aspect of the dataset, and the AI agent processes the user's question and uses the dataset to extract relevant content.

In an example, the execution engine can generate the chunks in response to addition or upload of a dataset to the AI agent. The execution engine initially receives the dataset in its raw form, which may consist of a combination of structured and unstructured data, such as text, tables, or figures. To facilitate the efficient processing and retrieval of information, the execution engine applies an embedding model to generate numerical representations (embeddings) of the content. The embedding model captures the semantic meaning of the data, enabling the identification of similar concepts and information relationships throughout the dataset.

Once the embeddings are generated, the content is partitioned into manageable segments or "chunks" based on predefined chunking parameters. These parameters can include semantic relevance, optimal token count, or contextual boundaries, which ensure that each chunk remains cohesive and meaningful within the broader context of the dataset. For example, paragraphs or sections of text that convey a distinct concept or information topic may be grouped together as a single chunk. This chunking approach ensures that each segment contains enough information to support contextual comprehension by the LLM, while maintaining a size suitable for efficient processing.

The chunks generated through this process are subsequently stored in an indexed format, allowing for rapid and relevant retrieval during query processing. By ingesting the dataset in this structured manner, the execution engine enables the LLM to access the most pertinent information and generate accurate responses to user inquiries. The use of an embedding model and intelligent chunking provides a robust mechanism for semantic search, minimizing the latency and maximizing the relevance of the retrieved information.

At stage 120, for each chunk, the execution engine can submit, to a question generation AI model, a request to generate user questions to which the chunk would be responsive. The question generation AI model can be any kind of language model, such as an LLM, a small language model ("SLM"), a fine-tuned model, or a multimodal language model. In one example, the question generation AI model can be specifically trained to generate potential questions an end user may ask about the content of a data chunk. This AI model can be designed to enhance the interactive capability of the system by anticipating the types of inquiries that could arise, thereby streamlining the process of providing relevant and actionable responses. The model can be trained on a wide variety of natural language datasets, allowing it to understand different ways information may be queried and presented.

Upon receiving each data chunk, the question generation AI model can analyze the content to identify key points, important concepts, and potential areas of user interest. The question generation AI model can leverage language generation techniques to craft questions that are contextually aligned with the chunk's content. These questions can range from factual inquiries, such as "What is the maximum speed limit described in this section?" to conceptual questions, like "How does this procedure ensure safety during emergency landings?" By generating a diverse array of possible questions, the AI model not only provides a broad coverage of the information but also aids in creating an index of anticipated user queries, effectively improving the dataset's accessibility.

The AI model is also capable of generating different questions for the same data chunk, tailored to various designated personas. The execution engine can specify these personas to reflect different styles, levels of expertise, or user roles. For example, the same chunk can be used to generate highly technical questions for an expert audience, casual questions for a general user, or questions employing colloquial language for users who may use a more informal interaction. Furthermore, the personas can represent different user types, such as an end user seeking practical guidance, an engineer looking for technical details, a management user interested in strategic implications, or a support user needing troubleshooting assistance. By adapting the generated questions to fit these diverse personas, the AI model ensures that the data is accessible and relevant to a broader audience, enhancing the flexibility and usability of the system across various contexts and user needs.

At stage 130, for each chunk, the execution engine can receive generated questions for the respective chunk. This transfer process can include packaging the questions along with metadata that links each question to its respective data chunk and persona designation. The software engine receives these questions through a structured data communication protocol, ensuring that the information is accurately transmitted and can be efficiently processed.

At stage 140, for each chunk, the execution engine can vectorize the generated questions to create question vectors. The execution engine can vectorize the questions using an embedding model. This embedding model transforms the questions into high-dimensional numerical representations, known as vectors, which capture the semantic meaning of each question. The engine applies this transformation to ensure that questions with similar meanings, even if worded differently, are positioned closely in the vector space. By doing so, the system enables more efficient search and retrieval, allowing it to match user queries with the most relevant pre-generated questions.

The embedding process enhances the system's ability to compare and rank questions based on their contextual and semantic similarities. For example, questions generated for different personas, such as technical and casual users, may be vectorized and mapped in such a way that their underlying meaning is preserved, even if the language or tone differs.

At stage 150, the execution engine can store the question vectors in a vector database. These vectorized representations can be stored in an indexed format, allowing the AI agent to quickly retrieve the most relevant questions during real-time user interactions. This vectorization not only streamlines search capabilities but also improves the overall responsiveness and accuracy of the AI agent.

The questions generated for each data chunk can be further utilized to enhance search relevance and user engagement. By proactively generating these potential questions, the system can create a question-answer mapping that aligns with the data chunks, facilitating more intuitive user interaction. This process enables the system to deliver pre-constructed answers or guide the LLM in formulating responses when similar questions are asked by users. This preemptive question generation also helps optimize the AI agent's retrieval function, reducing response times and improving the overall user experience by making information more readily accessible and directly applicable to user needs.

Although generated questions are discussed herein, it is understood that generated inputs can also more broadly apply to the examples. For example, instead of generating a question, the AI model could generate an input, which could be a combination of selections the user might make on a UI that utilizes a particular AI agent. A generated input can include a generated question, including predicted questions from a persona.

FIG. 2 is a flowchart of an example method for matching a query input to a pre-generated question for an AI agent. The stages can be performed by an execution engine or at the behest of the execution engine. Alternatively, the stages can be performed by another engine, such as an execution engine, or at the behest of the other engine. The execution engine can execute as one or more processes on one or more hardware servers. The method described below can take place after the stages outlined in FIG. 1, where questions have already been generated, vectorized, and stored in a vector database, along with metadata linking them to their corresponding data chunks.

At stage 210, an execution engine can receive a user query as input. The query is one type of received input. For example, a user can input a query into an interface for an AI agent. In one example, the execution engine can directly receive user queries for the AI agent. Alternatively, the query can initially be received by a component that manages the AI agent, such as an execution engine. The execution engine can communicate to the execution engine that a user query has been received. The execution engine can then access the query. For example, the execution engine can save the user query in a cache that the execution engine can access.

At stage 220, the execution engine can semantically compare the input to the generated questions. To begin, the execution engine can vectorize the input by applying the same embedding model that was used to generate embeddings for the pre-generated questions. This transforms the query into a numerical vector that captures its semantic meaning, allowing it to be compared with the existing vectors in the database. By utilizing vector embeddings, the engine ensures that even if the wording of the user query differs from the pre-generated questions, the underlying intent or meaning can still be effectively matched.

Once the user query is vectorized, the execution engine can compute the similarity between the query's vector and the stored vectors of the pre-generated questions for the dataset. This comparison can be based on mathematical techniques such as cosine similarity, which measures how closely aligned two vectors are in the high-dimensional space. The engine retrieves the pre-generated questions whose vectors are most similar to the query vector, identifying those that best match the semantic intent of the user's query. Because the vector embeddings capture nuances in language and context, the system can recognize relevant questions even if the user phrased the query differently or used synonyms.

After identifying the closest matches, the software engine retrieves the pre-generated questions along with their associated data chunks from the vector database. These results are then used to formulate a response, either by presenting the most relevant question-answer pairs directly to the user or by refining the search results for the language model to generate a tailored response. This semantic comparison process enables the AI agent to efficiently handle user queries, ensuring that the system retrieves and delivers contextually relevant information with high accuracy, even when the user's query is not an exact match to the pre-generated questions.

At stage 230, the execution engine can retrieve the chunk associated with the metadata of the similar question. Each pre-generated question in the vector database is stored alongside metadata that links it to a specific data chunk from the original dataset. By referencing this metadata, the engine quickly locates the corresponding data chunk, ensuring that the information relevant to the user's query is readily accessible. The chunks can be stored in the same or a different vector database as the embeddings for the pre-generated questions. Table 1 below is an example entry in a vector database that includes the question embeddings and the metadata.

TABLE 1

```
{
    "id": "chunk_123",
    "queries_embedding": [0.45, 0.89, 0.12, ... ],
    "queries_embedding": [0.45, 0.88, 0.12, ... ],
    "queries_embedding": [0.45, 0.89, 0.11, ... ],
    "metadata": {
        "chunk_text": "This is a sample text chunk.",
    }
}
```

In TABLE 1, the "id" is an ID associated with the corresponding chunk, "chunk text" is the text of the chunk from the dataset, and "queries_embedding" are the vector embeddings of the pre-generated questions. As shown, the chunked text is stored as metadata.

Table 2 below is an example entry in a vector database that includes the pre-generated questions ("query" field), their respective embeddings ("queries_embedding" field), and an ID for the chunk ("chunk_ID" field).

TABLE 2

```
{
    "query": "Text of first question",
    "query_embedding": [0.32, 0.45, 0.18, ... ],
    "query": "Text of second question",
    "query_embedding": [0.32, 0.45, 0.18, ... ],
    "chunk_id": "chunk_001"
}
```

The chunk_ID field in references a corresponding chunk stored in a second vector database. For example, as shown below in the example entry in TABLE 3 below, entries in the second vector database can include a chunk_id field that maps to the chunk_id field in the first vector database. The second database entries can also into the chunked text ("chunk" field) and an embedding of the chunked text ("embedding" field).

TABLE 3

```
{
    "chunk": "This is the chunked text ",
    "embedding": [0.25, 0.34, 0.15, ... ],
    "chunk_id": "chunk_001"
}
```

In instances in which two vector databases are used like with TABLE 2 and TABLE 3, the execution engine can semantically compare the user input to the vector embeddings of the pre-generated questions, retrieve the corresponding chunk ID, and retrieve the chunked text and/or the chunk embedding with the matching chunk ID from the second vector database.

In another example, the metadata can include a question ID or a result ID. Either ID can be associated with a stored result, allowing the AI agent execution engine to use the metadata to retrieve the stored result. This can allow for bypassing stages 240 and 250, and sending the stored result to the user device at stage 260.

At stage 240, the execution engine can submit, to a second AI model, (1) the user query or the identified semantically similar question and (2) the identified chunk associated with the identified semantically similar question. The second AI model can be an AI model assigned to the AI agent. In one example, the execution engine sends the user's query along with the relevant data chunk to the second AI model. However, in cases where an organization prefers to limit user-generated queries, the execution engine can instead submit the semantically similar pre-generated question and the associated chunk. This approach helps mitigate the risk of unexpected responses and prevents users from injecting unintended prompts.

At stage 250, after the second AI model processes the inputs—whether the user query or the semantically similar pre-generated question along with the associated data chunk—the execution engine can receive the resulting output from the model. This output may consist of a refined response, an answer based on the content of the data chunk, or additional information synthesized by the AI model. Upon receiving the results, the execution engine can further process or format the response to ensure it aligns with the desired output for the end user.

At stage 260, the execution engine can transmit the results to the user device. The user device can then display the results to the user. This seamless interaction between the software engine and the second AI model ensures that the user receives contextually relevant and accurate information, whether the question was user-generated or selected from pre-generated queries.

As mentioned in the description of stage 230, similar steps can be used to retrieve stored (e.g., cached) results. For example, the result of stage 250 can also be stored for later retrieval, such as in a cache storage. In one example, the result can be stored in association with a question ID that corresponds to metadata of the question vector. When a future AI agent input is received, vectorized, and matched against the question vector, the AI agent execution engine can check for a corresponding cached result. For example, the stored results can be searched using the question ID. When there is a match, the submission to the second AI model at stage 240 can be bypassed.

Alternatively, the AI agent execution engine can add a result ID to the question vector metadata, such as at stage 250 or 260. Then the future AI agent input can be matched to the stored result by looking up the result using the result ID obtained from the semantically similar question vector. In either approach, the AI agent execution engine can store the result in association with metadata of the question vector. In the future, when the AI agent execution engine receives an AI agent input from a user device, the AI agent execution engine can vectorize part of the AI agent input to create an input vector. Then the AI agent execution engine can cause identification of the question vector as meeting a threshold similarity to the input vector, such as a threshold distance or angle. The AI agent execution engine can then retrieve the stored result using the metadata of the question vector. The stored result can be transmitted to the user device, bypassing submitting the stored version of the result to the second AI model at stage 240.

In one example, a table or other data structure that relates the question ID or result ID to a result can also include access privileges required to access the result. This can ensure that cached results are only available to users with the appropriate access privileges or credentials. The required access privileges can be derived based on permission requirements of the chunks used in creating the result. For example, the chunks can be designated the same permissions (e.g., highly confidential) as the content item to which they pertain or can have their own permission designations. The execution engine can take an intersection of the chunk permissions, resulting in a least permissive combination of the permissions, and designate the access privileges of the result as having that least permissive combination. Then, when a user submits an AI agent input that implicates the stored result, the access privileges of the stored result can be compared against the access privileges of the user. If the user has the same or higher access privileges as the result, the execution engine can supply the stored result and bypass stages 240 and 250.

Figure 3:
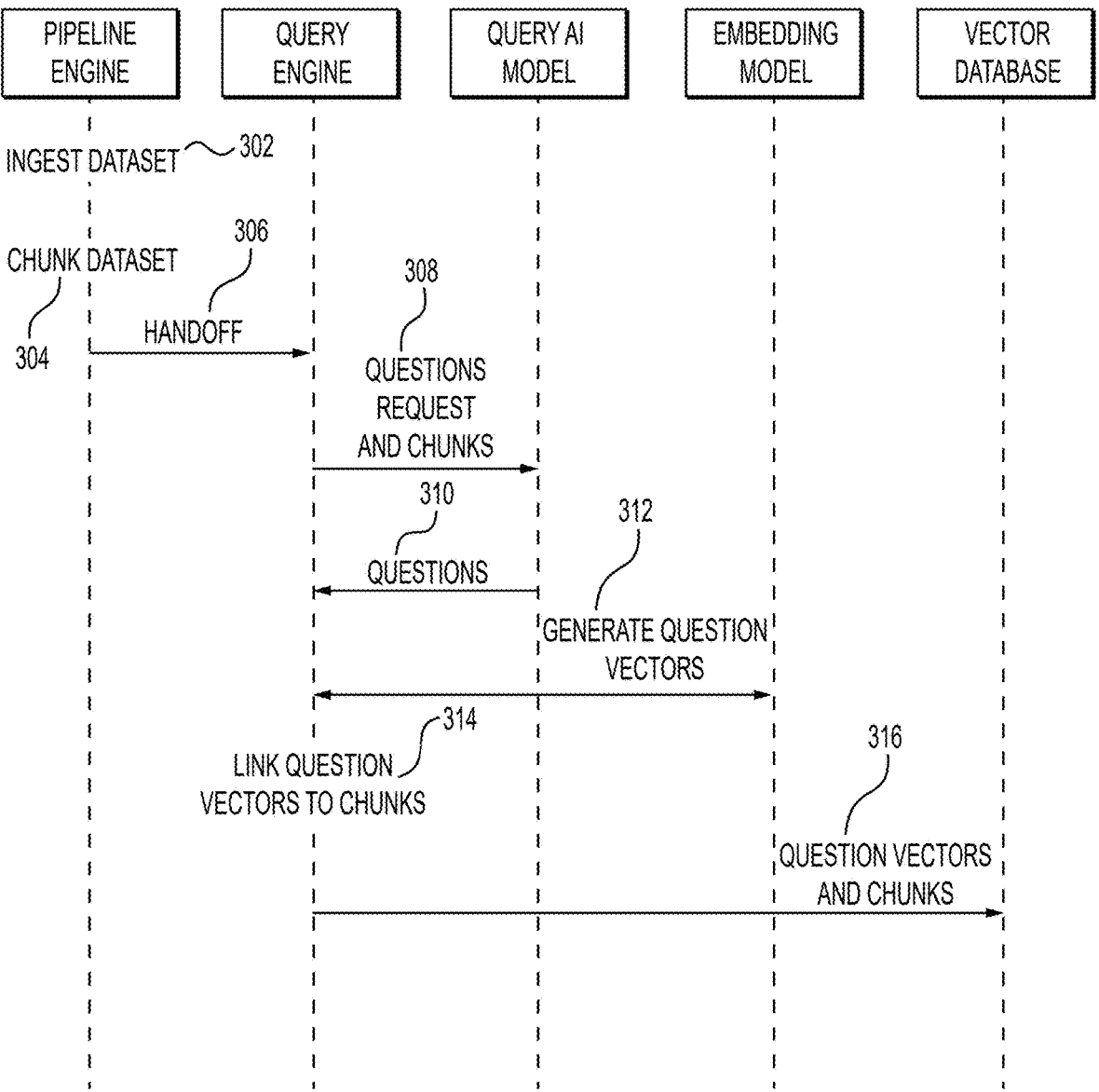
FIG. 3 is a sequence diagram of an example method for identifying and caching potential queries of an AI agent.

FIG. 3 is a sequence diagram of an example method for identifying and caching potential queries of an AI agent. At stage 302, an execution engine can ingest a dataset for an AI agent. This can occur when an AI agent is created or updated. A dataset can be added to an AI agent through several methods, utilizing different communication protocols to suit various system architectures. One common method is through direct upload via a Representational State Transfer ("REST") Application Programming Interface ("API"), where a client application sends the dataset to the AI agent's ingestion endpoint over Hypertext Transfer Protocol ("HTTP") or HTTP Secure ("HTTPS"). In this approach, the dataset is can be submitted as a JavaScript Object Notation ("JSON") or multipart/form-data payload, along with relevant metadata, such as its format or source. The API handles the upload, validates the dataset, and initiates its storage for further processing within the pipeline. Other methods that can be used include message queuing protocols, such as Advanced Message Queuing Protocol ("AMQP") or Message Queuing Telemetry Transport ("MQTT"), and File Transfer Protocols ("FTP") or Secure FTP ("SFTP").

Upon ingesting the dataset, the execution engine can initiate a multi-stage preprocessing workflow that structures the raw data for optimized interaction with the AI agent. Upon ingestion, the engine first parses the dataset, which may consist of structured, semi-structured, or unstructured data formats, such as text, images, or tabular information.

At stage 304, an execution engine can chunk the dataset. This can include segmenting the data into discrete, contextually meaningful units, or "chunks," based on predefined chunking parameters, such as token count thresholds or semantic boundaries.

At stage 306, the execution engine can signal the execution engine to take over by triggering a handoff mechanism. This can occur through an internal event, message, or API call. The execution engine's role ends after it preprocesses the data, dividing it into manageable chunks and storing them in the system along with relevant metadata. Upon receiving the signal, the execution engine activates and begins processing the newly created chunks.

At stage 308, for each chunk, the execution engine can send, to a question generation AI model, a request for a set of anticipated questions a user may likely ask about the specific chunk. In the request, the execution engine can specify multiple personas, each corresponding to distinct user types, including, but not limited to, highly technical users (e.g., engineers), support-level users (e.g., customer service), and end users (e.g., general consumers). The inclusion of personas allows the question generation AI model to tailor its question generation based on the expected knowledge level, language style, and context relevant to each user type.

The question generation AI model processes this input by analyzing the semantic and structural properties of the data chunk and synthesizing a variety of questions specific to each persona. For a highly technical user, the question generation AI model may generate detailed, jargon-heavy questions that probe deep into the functionality or technical specifications outlined in the data chunk. In contrast, for a support-level user, the questions may focus on troubleshooting procedures or user-friendly explanations, while for end users, the question generation AI model may produce simpler, high-level questions that emphasize general functionality or practical application.

At stage 310, the question generation AI model can send the generated questions to the execution engine. These questions are transmitted in a structured format, such as a JSON file or an extensible Markup Language ("XML") file.

The execution engine retrieves these persona-specific questions and links them back to the corresponding data chunk, along with metadata that associates each question with its respective persona. This interaction enables the system to anticipate diverse user queries, ensuring that the AI agent can dynamically respond to different user needs while maintaining high relevance to the original dataset.

At stage 312, the execution engine can vectorize each question to enable efficient semantic search and retrieval. The vectorization process involves applying an embedding model, such as a pre-trained transformer-based model (e.g., Bidirectional Encoder Representations from Transformers ("BERT") or Generative Pre-trained Transformer ("GPT") embeddings), which converts the textual questions into high-dimensional vector representations. The execution engine performs this operation for each question.

At stage 314, the execution engine can link the question vectors to their corresponding chunks. In one example, the execution engine can create a vector database entry for each data chunk, and each entry can include the vectorized questions with metadata of the chunked text, such as that shown in TABLE 1. The execution engine can then save these in a vector database at stage 316. Alternatively, the execution engine can create separate vector database entries for the vectorized questions and their corresponding data chunks, and the execution engine can reference the entries to each other. The execution engine can then save the vectorized questions in one vector database and the chunked text in another. In some examples, the generated questions sent by the generation AI model at stage 310 can already include metadata that links each question to its corresponding persona and the associated data chunk. In such instances, the execution engine can reformat the data based on the storage mechanism used.

Figure 4:
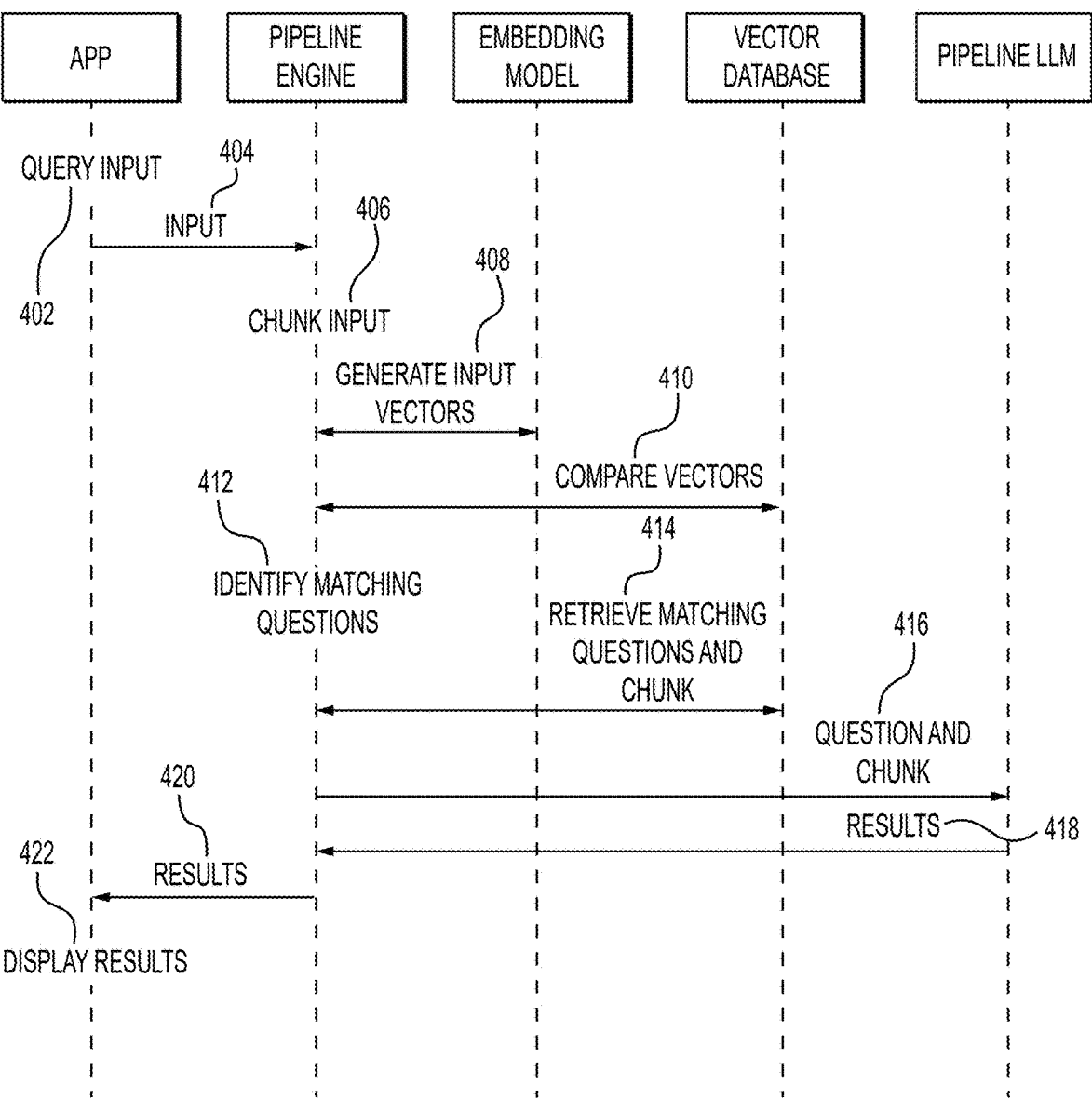
FIG. 4 is a sequence diagram of an example method for matching a query input to a pre-generated question for an AI agent.

FIG. 4 is a sequence diagram of an example method for matching a query input to a pre-generated question for an AI agent. This can be used to match a generated input and retrieve a chunk associated with the matching generated input. This method can occur after the method of FIG. 3 above is completed. For example, before stage 402, questions that users may ask about each data chunk in a dataset have been pre-generated, vectorized, and stored in a vector database, along with metadata linking them to their corresponding data chunks.

At stage 402, a user can input a query into an application. The application can be front-end layer for interacting with AI agents. The application is designed to capture, process, and relay user queries.

At stage 404, the application can send the input to an execution engine. The application can send the input using any appropriate communication protocol, such as an API or HTTPS call. The input can include the user's request and any relevant metadata, such as information identifying the user, the user's profile, any groups the user is assigned to, and so on.

At stage 406, the execution engine can chunk the input. This can include segmenting the input into smaller, contextually relevant units. This chunking is based on predefined chunking parameters, such as token limits or semantic boundaries, ensuring that each chunk retains coherence for further processing. The execution engine can apply natural language processing ("NLP") techniques to ensure that the segmentation maintains logical structure, allowing each chunk to represent a self-contained portion of the query, which can then be efficiently processed by downstream components, such as an AI model.

At stage 408, the execution engine can generate input vectors. The execution engine can do this by applying an embedding model, such as a transformer-based architecture like BERT or GPT. This model converts the chunked text into dense, high-dimensional vector representations, where each vector captures the semantic properties and relationships of the input data. By encoding the chunks into vectors, the engine creates a numerical representation that can be efficiently compared with other vectors in the system, such as those from pre-generated questions or dataset content.

At stage 410, the execution engine can compare the input vectors with the pre-generated question vectors in the vector database. Using methods such as cosine similarity or other distance metrics, the engine measures the alignment between the high-dimensional vectors, assessing the degree of semantic overlap. This comparison enables the engine to identify which pre-generated questions, based on their vectors, are most closely related to the meaning of the user's input, even if the phrasing is different. The vector-based matching ensures that the system captures not only syntactic similarities but also deeper contextual and conceptual relationships between the user's query and the dataset's pre-generated questions.

At stage 412, the execution engine can identify a matching question. In one example, a matching question can be a question that is the most semantically similar to the user input. For example, cosine similarity measures the cosine of the angle between two vectors in a multidimensional space, producing a value between −1 and 1. When using a cosine similarity technique, the matching question can be the question with the value closest to 1. In one example, a minimum score threshold can be used to ensure that the identified question is, in fact, semantically similar. For example, when using cosine similarity, the execution engine can require that the most semantically similar question scores at least a 0.5.

Once the closest matches are identified, the corresponding data chunks or responses can be retrieved for further processing, allowing the system to provide a contextually relevant answer to the user.

At stage 414, the execution engine can retrieve the matching question and corresponding chunk. The execution engine can use the metadata linked to the matching vector to locate the precise data chunk tied to that question. This retrieved data chunk contains the relevant information from the original dataset, which the execution engine can now pass along for further processing.

At stage 416, the execution engine can send the question and the chunk to the pipeline AI model. This can occur using an external API call, allowing the AI model to process the data in real time. The execution engine can be configured to send either the user's query or the matching question to the pipeline AI model. The execution engine formats the data according to the API requirements of the pipeline AI model, ensuring proper transmission of the question and the relevant chunk. The AI model, can process the question and data chunk to generate a detailed and contextually accurate response. At stage 418, the AI model can send the results to the execution engine.

At stage 420, the execution engine can send the results to the application. In an example, the execution engine can process the response to ensure it aligns with the application's format and user interface requirements. The execution engine then packages the response, including any relevant metadata or context, and sends it back to the application via a secure API or messaging protocol.

Once the application receives the results, at stage 422, it renders the response in a user-friendly format, making it easily accessible and understandable for the end user.

FIG. 5 is a flowchart of another example method for identifying and caching potential AI agent inputs (e.g., queries) of an AI agent that includes keyword matching. Although queries are used as an example, the AI agent input need not be a query. For example, a string of letters or numbers can be used to match against chunks or cached results, in an example. But for ease of explanation, queries are described in the following figures. At stage 510, an execution engine can generate chunks for content of a dataset based on an embedding model and chunking parameters. The dataset serves as reference material or a knowledge base for an AI model. A user can input a query into the AI agent, such as asking about a specific aspect of the dataset, and the AI agent processes the user's question and uses the dataset to extract relevant content.

In an example, the execution engine can generate the chunks in response to addition or upload of a dataset to the AI agent. The execution engine initially receives the dataset in its raw form, which may consist of a combination of structured and unstructured data, such as text, tables, or figures. To facilitate the efficient processing and retrieval of information, the execution engine applies an embedding model to generate numerical representations (embeddings) of the content. The embedding model captures the semantic meaning of the data, enabling the identification of similar concepts and information relationships throughout the dataset.

Once the embeddings are generated, the content is partitioned into manageable segments or "chunks" based on predefined chunking parameters. These parameters can include semantic relevance, optimal token count, or contextual boundaries, which ensure that each chunk remains cohesive and meaningful within the broader context of the dataset. For example, paragraphs or sections of text that convey a distinct concept or information topic may be grouped together as a single chunk. This chunking approach ensures that each segment contains enough information to support contextual comprehension by the LLM, while maintaining a size suitable for efficient processing.

The chunks generated through this process are subsequently stored in an indexed format, allowing for rapid and relevant retrieval during query processing. By ingesting the dataset in this structured manner, the execution engine enables the LLM to access the most pertinent information and generate accurate responses to user inquiries. The use of an embedding model and intelligent chunking provides a robust mechanism for semantic search, minimizing the latency and maximizing the relevance of the retrieved information.

At stage 520, the execution engine can vectorize the chunks using an embedding model. This embedding model transforms the questions into high-dimensional numerical representations, known as vectors, which capture the semantic meaning of each question. The execution engine applies this transformation to ensure that chunks with similar meanings, even if worded differently, are positioned closely in the vector space. By doing so, the system enables more efficient search and retrieval.

At stage 530, for each chunk, the execution engine can submit, to a question generation AI model, a request to generate user questions to which the chunk would be responsive. The question generation AI model can be any kind of language model, such as an LLM, an SLM, a fine-tuned model, or a multimodal language model. In one example, the question generation AI model can be specifically trained to generate potential questions an end user may ask about the content of a data chunk. This AI model can be designed to enhance the interactive capability of the system by anticipating the types of inquiries that could arise, thereby streamlining the process of providing relevant and actionable responses. The model can be trained on a wide variety of natural language datasets, allowing it to understand different ways information may be queried and presented.

Upon receiving each data chunk, the question generation AI model can analyze the content to identify key points, important concepts, and potential areas of user interest. The question generation AI model can leverage language generation techniques to craft questions that are contextually aligned with the chunk's content. These questions can range from factual inquiries, such as "What is the maximum speed limit described in this section?" to conceptual questions, like "How does this procedure ensure safety during emergency landings?" By generating a diverse array of possible questions, the AI model not only provides a broad coverage of the information but also aids in creating an index of anticipated user queries, effectively improving the dataset's accessibility.

The AI model is also capable of generating different questions for the same data chunk, tailored to various designated personas. This can result in the generated inputs reflecting predicted user questions from the various personas. The execution engine can specify these personas to reflect different styles, levels of expertise, or different user roles. For example, the same chunk can be used to generate highly technical questions for an expert audience, casual questions for a general user, or questions employing colloquial language for users who may use a more informal interaction. Furthermore, the personas can represent different user types, such as an end user seeking practical guidance, an engineer looking for technical details, a management user interested in strategic implications, or a support user needing troubleshooting assistance. By adapting the generated questions to fit these diverse personas, the AI model ensures that the data is accessible and relevant to a broader audience, enhancing the flexibility and usability of the system across various contexts and user needs.

At stage 540, the execution engine can receive generated questions for each chunk. This transfer process can include packaging the questions along with metadata that links each question to its respective data chunk and persona designation. The execution engine receives these questions through a structured data communication protocol, ensuring that the information is accurately transmitted and can be efficiently processed.

The generated questions can include generated keywords that are likely to appear in a user query. In one example, these generated keywords can be periodically refreshed by an AI agent that updates the metadata of chunks based on when the keywords were last generated. For example, the metadata can include a date of generation, such as at ingestion or at the last metadata update. For example, after one year of time, an AI agent can request any recent keywords or questions that are relevant to the chunk or document as a whole. The AI agent can add the recent keywords to the metadata and update the field indicating the date of generation. In one example, even if no new keywords are added, the generation field can be updated such that the AI agent will not check again for new keywords until the time threshold again is passed.

The metadata can also include an agent execution instruction that causes a keyword or a semantic search of some other source for additional items to include in the metadata. This can allow the execution engine to add keywords from this other source, such as the internet. The execution engine can search the source with the current metadata keywords, instructing the source to return keywords that are similar or recently relevant. In one example, the metadata includes a pointer to a location that already includes the recent keywords, allowing the execution engine to retrieve those recent keywords.

The metadata can include a link to an endpoint. The metadata can include the key or the execution engine can use a universal credential to keep such credentials out of the metadata. At the endpoint, an execution engine can execute an AI agent to find keywords or rules relevant to accessing the chunk. In this way, the metadata can cause execution on an AI agent that adds additional management rules, keywords, and other criteria to the chunk. As an example, if the document was uploaded with management rules attached as to functions allowed for the document, those management rules can be accessed via the link in the metadata.

At stage 550, the execution engine can store each vectorized chunk in a vector database where vectorized chunks are stored with metadata linking them to their respective questions. For example, each database entry can include the chunked text and respective vector embeddings, and the pre-generated questions can be stored as metadata for the chunked text. Table 4 below is an example entry in a vector database that includes the chunk embeddings and the metadata with pre-generated questions.

TABLE 4

```
{
  "id": "chunk_123",
  "embedding": [0.45, 0.89, 0.12, ... ],
  "metadata": {
    "chunk_text": "This is a sample text chunk.",
    "probable_queries": [
      "What is this chunk about?",
      "Summarize the text in this chunk."
    ]
  }
}
```

In TABLE 4, the "id" is an ID associated with the corresponding chunk, "embedding" is the vector embedding of the chunk, "metadata" is the metadata for the entry, "chunk text" is the text of the chunk from the dataset, and "probable_queries" are the text for the pre-generated questions.

FIG. 6 is a flowchart of another example method for matching a query input to a pre-generated question for an AI agent. The stages can be performed by an execution engine or at the behest of the execution engine. Alternatively, the stages can be performed by another engine, such as an execution engine, or at the behest of the other engine. The execution engine can execute as one or more processes on one or more hardware servers. The method described below can take place after the stages outlined in FIG. 1, where questions have already been generated, vectorized, and stored in a vector database, along with metadata linking them to their corresponding data chunks.

At stage 610, an execution engine can receive a user query. For example, a user can input a query into an interface for an AI agent. In one example, the execution engine can directly receive user queries for the AI agent. Alternatively, the query can initially be received by a component that manages the AI agent, such as an execution engine. The execution engine can communicate to the execution engine that a user query has been received. The execution engine can then access the query. For example, the execution engine can save the user query in a cache that the execution engine can access.

At stage 620, the execution engine can extract keywords from the user query. For example, the execution engine can preprocess the query by performing tokenization to split the input into individual components, followed by normalization steps that convert all text to lowercase and remove common stop words. The execution engine can then employ stemming techniques to reduce words to their root forms. Finally, a scoring algorithm can be applied to rank the extracted keywords based on their relevance to the overall context of the user query. This refined set of keywords can then be utilized in subsequent stages of the AI agent, enhancing the system's capability for information retrieval, context recognition, and response generation.

Several scoring algorithms could be applied to rank the extracted keywords based on their relevance to the user query. For example, a Term Frequency-Inverse Document Frequency (TF-IDF) algorithm can be employed. TF-IDF is a statistical measure used to evaluate the importance of a word in a document relative to a collection (or corpus) of documents. It calculates two values: the term frequency (TF), which measures how often a word appears in the document, and the inverse document frequency (IDF), which measures how common or rare the word is across all documents. After stemming and stop-word removal, the TF-IDF score could be calculated for each keyword in the user query. Keywords with higher TF-IDF scores would indicate higher relevance for retrieval and response generation.

Alternatively, BM25 is an extension of TF-IDF and is often used for information retrieval tasks because it incorporates term saturation and document length normalization. It ranks documents based on the query's terms' frequency and positions within the documents. For query keyword extraction, BM25 could rank keywords based on their frequency and the lengths of the queries. This ranking method can further prioritize keywords that appear frequently and in shorter, more direct queries.

Another option is Cosine Similarity with Word Embeddings. Cosine similarity measures the cosine of the angle between two non-zero vectors in a multi-dimensional space. With word embeddings (e.g., Word2Vec or GloVe), the model calculates the semantic similarity between keywords and other terms based on context rather than pure word frequency. By calculating the cosine similarity between the query and potential keywords or phrases in the corpus, the engine could rank keywords based on semantic closeness to the query's context.

Pointwise Mutual Information (PMI) measures the association between two words by comparing the observed frequency of the word pair to the probability expected if they were independent. High PMI scores indicate a stronger association. PMI can score keywords based on their likelihood of co-occurring with other query words in a corpus, thus providing a measure of contextual relevance.

Neural Scoring Algorithms (e.g., BERTScore) can be used based on their transformer-based models (like BERT).

BERTScore can evaluate similarity by comparing word embeddings for both precision and recall in context. For high-accuracy keyword ranking, the pipeline could use BERTScore to compare embeddings of extracted keywords against the user query, refining relevance scores with contextual sensitivity.

Each of these scoring algorithms could be employed independently or in combination, depending on the system's requirements for speed, precision, and context sensitivity in keyword ranking.

At stage 630, the execution engine can compare the keywords to the pre-generated questions. This comparison process can leverage a combination of techniques, including exact keyword matching, fuzzy matching, and semantic analysis, to assess the degree of similarity between the user input and the stored questions. In one example, the execution engine can rank the stored questions to identify the most suitable match for the user query. This process not only enhances the accuracy of the matching but also improves the system's capability to understand user intent effectively.

In this approach, the execution engine matches user query keywords to pre-generated questions by leveraging one or more of the techniques—exact keyword matching, fuzzy matching, and semantic analysis—to determine similarity and relevance between the query and stored questions. Exact keyword matching provides a straightforward comparison by identifying direct matches between keywords in the user query and words in the stored questions. This approach is computationally efficient and effective for initial filtering, particularly when dealing with straightforward queries, although it may be limited in handling nuanced language or alternative phrasings. To enhance this, fuzzy matching techniques can be employed, allowing the engine to identify approximate matches that accommodate minor misspellings, typos, or small variations in word structure. Common fuzzy matching methods include Levenshtein Distance (edit distance), Jaccard Similarity, and N-gram matching, which offer a similarity score based on how closely terms match. These techniques broaden the scope of matches by capturing slight deviations, making the engine more robust in handling variations without sacrificing matching precision. To further capture user intent, the system can apply semantic analysis, which relies on machine learning models or pre-trained word embeddings, such as Word2Vec, GloVe, or BERT, to analyze the meaning behind words and phrases in the query. These models represent terms as vectors in a multi-dimensional space, enabling the engine to recognize words with similar meanings even when phrasing differs between the user query and stored questions. By using vector-based similarity measures, such as cosine similarity, semantic analysis determines the closeness of meaning between the query and stored questions, accounting for context and enhancing the matching accuracy.

In one example, the execution engine combines these techniques sequentially to optimize efficiency and depth. It begins by applying exact or fuzzy matching for an initial filtering, quickly excluding irrelevant questions. The execution engine then performs fuzzy matching to capture slight variations in phrasing and broadens the pool of relevant questions. The system performs a semantic analysis to assess user intent accurately, refining the match results based on contextual meaning. By layering exact matching, fuzzy matching, and semantic analysis, the execution engine provides both speed and depth, ensuring that responses are both relevant and contextually aligned with user queries. This multi-layered approach can allow the system to prioritize accuracy without compromising processing speed.

At stage 640, based on the comparison, the execution engine can identify a generated question that matches the user query. For example, the matching process can involve calculating a score for each question based on a scoring metric that considers several factors, including the number of keyword matches, the frequency of those keywords, and their proximity within the question. The execution engine can systematically count the total occurrences of each keyword from the user query within each stored question, assigning higher scores to questions with more substantial keyword overlap. Counting a total number of occurrences of each keyword from the input within each stored question can yield a higher score for questions with keyword overlap since the count can continue to increase as each different keyword is identified.

Additionally, the scoring metric can incorporate penalties for irrelevant keywords or consider the context in which the keywords appear. Ultimately, the question that yields a highest score can be selected as the matching question, serving as the basis for generating a relevant response that closely aligns with the user's intent. This method ensures that the system not only finds a relevant question but also prioritizes the one that is most likely to provide an accurate and helpful answer.

At stage 650, the execution engine can retrieve the chunk associated with the matching question. The chunked data comprises relevant information, such as context, background details, and potential answers linked to the matching question. This structured data is designed to provide comprehensive support for generating a tailored response to the user query. The engine systematically fetches this chunked data, ensuring that all pertinent information related to the matching question is gathered.

At stage 660, the execution engine can submit, to a second AI model, (1) the user query or the matching question and (2) the chunk associated with the matching question. The second AI model can be an AI model assigned to the AI agent. In one example, the execution engine sends the user's query along with the relevant data chunk to the second AI model. However, in cases where an organization prefers to limit user-generated queries, the execution engine can instead submit the matching pre-generated question and the associated chunk. This approach helps mitigate the risk of unexpected responses and prevents users from injecting unintended prompts.

After the second AI model processes the inputs—whether the user query or the pre-generated question along with the associated data chunk—the execution engine can receive the resulting output from the model. This output may consist of a refined response, an answer based on the content of the data chunk, or additional information synthesized by the AI model. Upon receiving the results, the execution engine can further process or format the response to ensure it aligns with the desired output for the end user.

At stage 670, after the second AI model processes the inputs—whether the user query or the semantically similar pre-generated question along with the associated data chunk—the execution engine can receive the resulting output from the model. This output may consist of a refined response, an answer based on the content of the data chunk, or additional information synthesized by the AI model. Upon receiving the results, the execution engine can further process or format the response to ensure it aligns with the desired output for the end user.

At stage 680, the execution engine can transmit the results to the user device. The user device can then display the results to the user. This seamless interaction between the software engine and the second AI model ensures that the user receives contextually relevant and accurate information, whether the question was user-generated or selected from pre-generated queries.

The results caching and retrieval described with respect to FIG. 2 can also apply to FIG. 6 and the other examples discussed herein.

Figure 7:
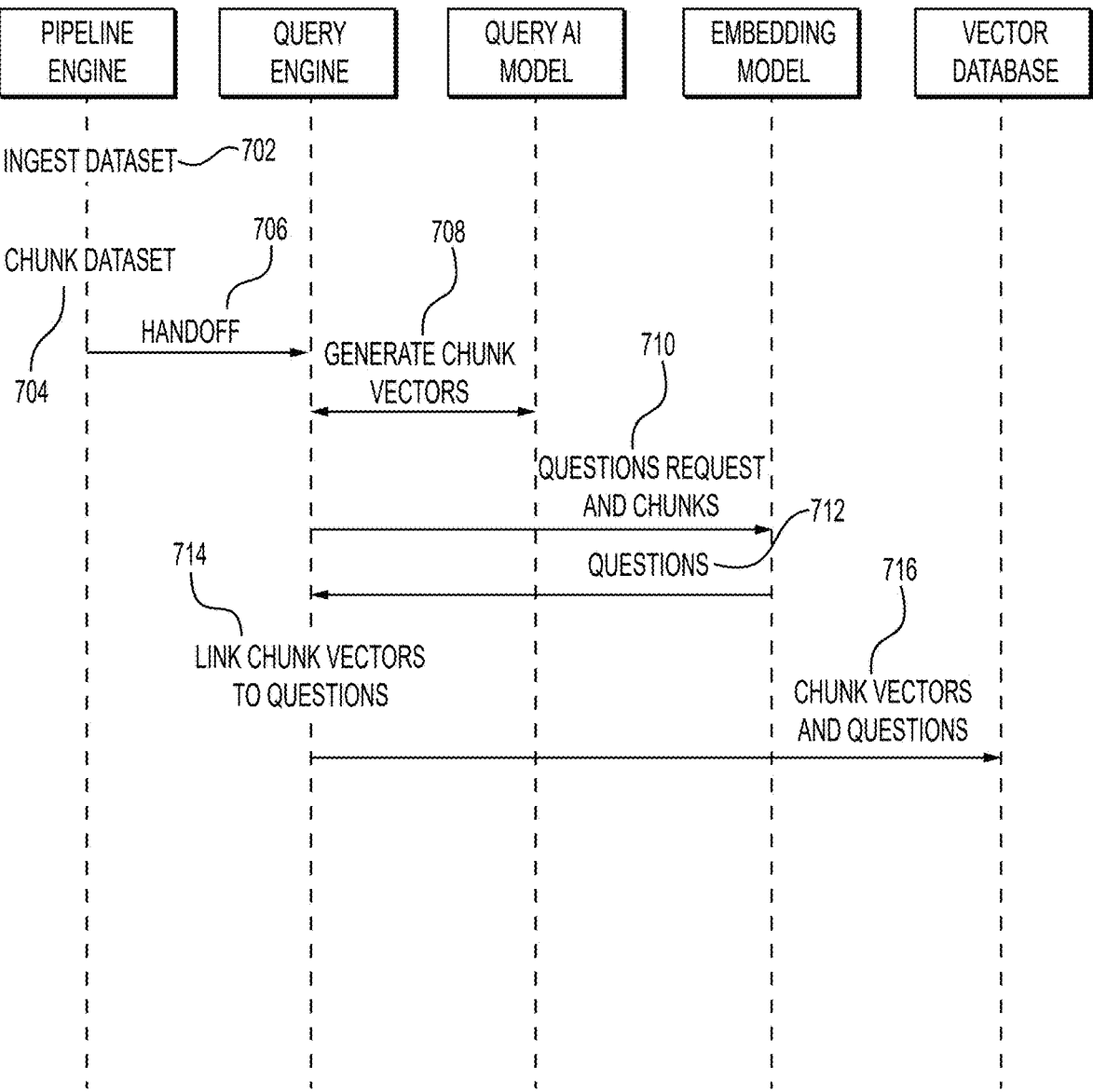
FIG. 7 is a sequence diagram of another example method for identifying and caching potential queries of an AI agent.

FIG. 7 is a sequence diagram of an example method for identifying and caching potential queries of an AI agent. At stage 702, an execution engine can ingest a dataset for an AI agent. This can occur when an AI agent is created or updated. A dataset can be added to an AI agent through several methods, utilizing different communication protocols to suit various system architectures. One common method is through direct upload via a REST API, where a client application sends the dataset to the AI agent's ingestion endpoint over HTTP or HTTPS. In this approach, the dataset can be submitted as a JSON or multipart/form-data payload, along with relevant metadata, such as its format or source. The API handles the upload, validates the dataset, and initiates its storage for further processing within the pipeline. Other methods that can be used include message queuing protocols, such as AMQP or MQTT, and FTP or SFTP.

Upon ingesting the dataset, the execution engine can initiate a multi-stage preprocessing workflow that structures the raw data for optimized interaction with the AI agent. Upon ingestion, the engine first parses the dataset, which may consist of structured, semi-structured, or unstructured data formats, such as text, images, or tabular information.

At stage 704, an execution engine can chunk the dataset. This can include segmenting the data into discrete, contextually meaningful units, or "chunks," based on predefined chunking parameters, such as token count thresholds or semantic boundaries.

At stage 706, the execution engine can signal the execution engine to take over by triggering a handoff mechanism. This can occur through an internal event, message, or API call. The execution engine's role ends after it preprocesses the data, dividing it into manageable chunks and storing them in the system along with relevant metadata. Upon receiving the signal, the execution engine activates and begins processing the newly created chunks.

At stage 708, the execution engine can generate vectors of the chunks. The vectorization process involves applying an embedding model, such as a pre-trained transformer-based model (e.g., BERT or GPT embeddings), which converts the textual questions into high-dimensional vector representations. The execution engine performs this operation for each chunk.

At stage 710, for each chunk, the execution engine can send, to a question generation AI model, a request for a set of anticipated questions a user may likely ask about the specific chunk. In the request, the execution engine can specify multiple personas, each corresponding to distinct user types, including, but not limited to, highly technical users (e.g., engineers), support-level users (e.g., customer service), and end users (e.g., general consumers). The inclusion of personas allows the question generation AI model to tailor its question generation based on the expected knowledge level, language style, and context relevant to each user type.

The question generation AI model processes this input by analyzing the semantic and structural properties of the data chunk and synthesizing a variety of questions specific to each persona. For a highly technical user, the question generation AI model may generate detailed, jargon-heavy questions that probe deep into the functionality or technical specifications outlined in the data chunk. In contrast, for a support-level user, the questions may focus on troubleshooting procedures or user-friendly explanations, while for end users, the question generation AI model may produce simpler, high-level questions that emphasize general functionality or practical application.

At stage 712, the question generation AI model can send the generated questions to the execution engine. These questions are transmitted in a structured format, such as a JSON file or an XML file.

At stage 714, the execution engine can link the chunk vectors to their corresponding questions. In one example, the execution engine can create a vector database entry for each data chunk vector, and each entry can include metadata with the chunked text and the pre-generated questions, such as that shown in TABLE 4. The execution engine can then save these in a vector database at stage 716.

Figure 8:
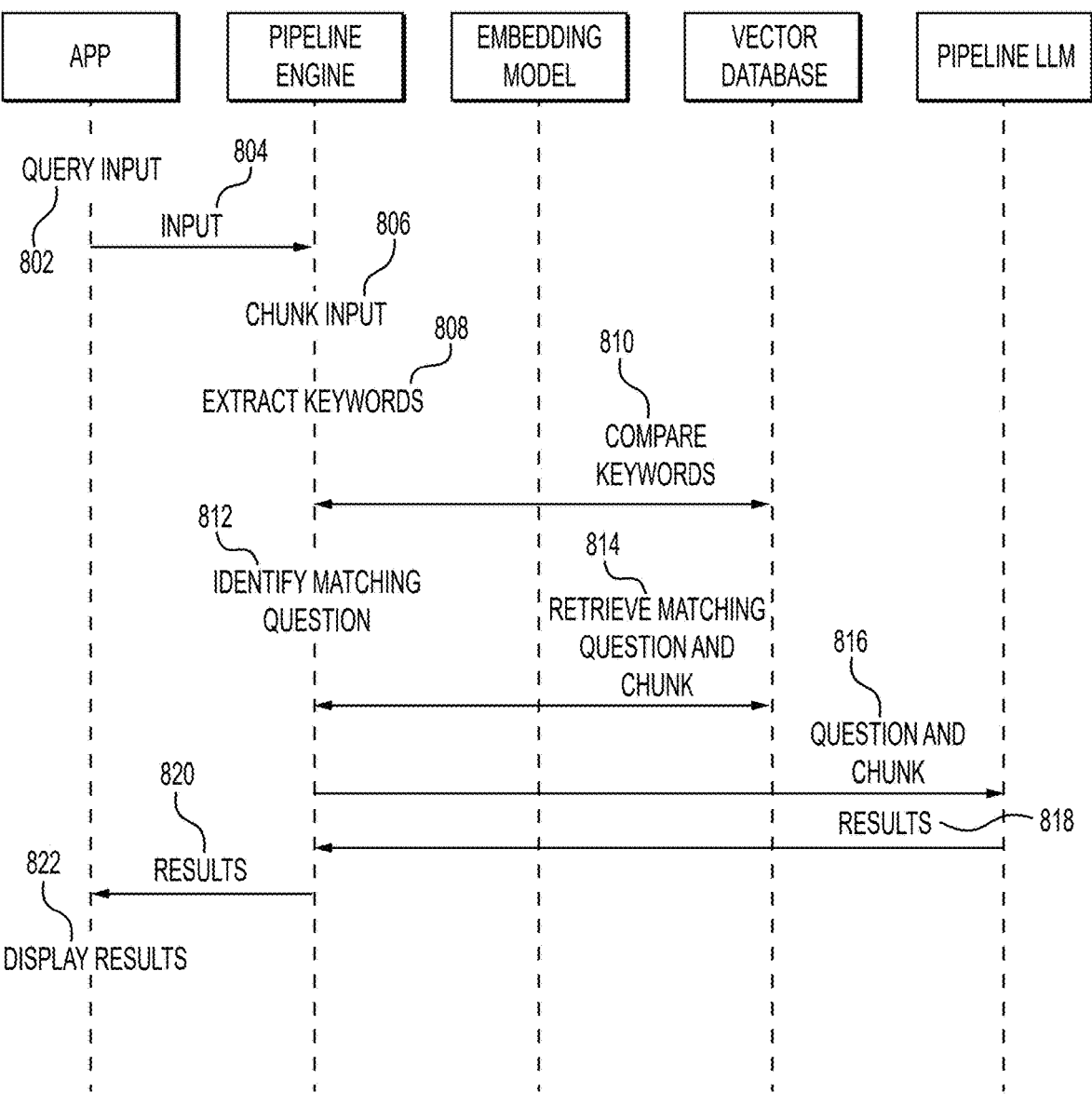
FIG. 8 is a sequence diagram of another example method for matching a query input to a pre-generated question for an AI agent.

FIG. 8 is a sequence diagram of another example method for matching a query input to a pre-generated question for an AI agent using keyword matching. This method can occur after the method of FIG. 7 above is completed. For example, before stage 802, questions that users may ask about each data chunk in a dataset have been pre-generated, vectorized, and stored in a vector database, along with metadata linking them to their corresponding data chunks.

At stage 802, a user can input a query into an application. The application can be front-end layer for interacting with AI agents. The application is designed to capture, process, and relay user queries.

At stage 804, the application can send the input to an execution engine. The application can send the input using any appropriate communication protocol, such as an API or HTTPS call. The input can include the user's request and any relevant metadata, such as information identifying the user, the user's profile, any groups the user is assigned to, and so on.

At stage 806, the execution engine can chunk the input. This can include segmenting the input into smaller, contextually relevant units. This chunking is based on predefined parameters, such as token limits or semantic boundaries, ensuring that each chunk retains coherence for further processing. The execution engine can apply natural language processing ("NLP") techniques to ensure that the segmentation maintains logical structure, allowing each chunk to represent a self-contained portion of the query, which can then be efficiently processed by downstream components, such as an AI model.

At stage 808, the execution engine can extract keywords from the input. For example, the execution engine can preprocess the query by performing tokenization to split the input into individual components, followed by normalization steps that convert all text to lowercase and remove common stop words. The execution engine can then employ stemming techniques to reduce words to their root forms. Finally, a scoring algorithm can be applied to rank the extracted keywords based on their relevance to the overall context of the user query. This refined set of keywords can then be utilized in subsequent stages of the AI agent, enhancing the system's capability for information retrieval, context recognition, and response generation.

At stage 810, the execution engine can compare the keywords with the pre-generated question in the vector database. This comparison process can leverage a combination of techniques, including exact keyword matching, fuzzy matching, and semantic analysis, to assess the degree of similarity between the user input and the stored questions. In one example, the execution engine can rank the stored questions to identify the most suitable match for the user query. This process not only enhances the accuracy of the matching but also improves the system's capability to understand user intent effectively.

At stage 812, the execution engine can identify a matching question. For example, the matching process can involve calculating a score for each question based on a scoring metric that considers several factors, including the number of keyword matches, the frequency of those keywords, and their proximity within the question. The execution engine can systematically count the total occurrences of each keyword from the user query within each stored question, assigning higher scores to questions with more substantial keyword overlap. Additionally, the scoring metric can incorporate penalties for irrelevant keywords or consider the context in which the keywords appear. Ultimately, the question that yields the highest score can be selected as the matching question, serving as the basis for generating a relevant response that closely aligns with the user's intent. This method ensures that the system not only finds a relevant question but also prioritizes the one that is most likely to provide an accurate and helpful answer.

At stage 814, once the closest matches are identified, the corresponding data chunks or responses can be retrieved for further processing, allowing the system to provide a contextually relevant answer to the user. The execution engine can use the metadata linked to the matching vector to locate the precise data chunk tied to that question. This retrieved data chunk contains the relevant information from the original dataset, which the execution engine can now pass along for further processing.

At stage 816, the execution engine can send the question and the chunk to the pipeline AI model. This can occur using an external API call, allowing the AI model to process the data in real time. The execution engine can be configured to send either the user's query or the matching question to the pipeline AI model. The execution engine formats the data according to the API requirements of the pipeline AI model, ensuring proper transmission of the question and the relevant chunk. The pipeline AI model, designed to handle a wide range of inputs, processes the question and data chunk to generate a detailed and contextually accurate response. At stage 818, the pipeline AI model can send the results to the execution engine.

At stage 820, the execution engine can send the results to the application. In an example, the execution engine can process the response to ensure it aligns with the application's format and user interface requirements. The execution engine then packages the response, including any relevant metadata or context, and sends it back to the application via a secure API or messaging protocol.

Once the application receives the results, at stage 822, it renders the response in a user-friendly format, making it easily accessible and understandable for the end user. This seamless flow between the execution engine, the third-party AI model, and the application ensures that the user receives accurate and contextually appropriate information in real time.

Figure 9:
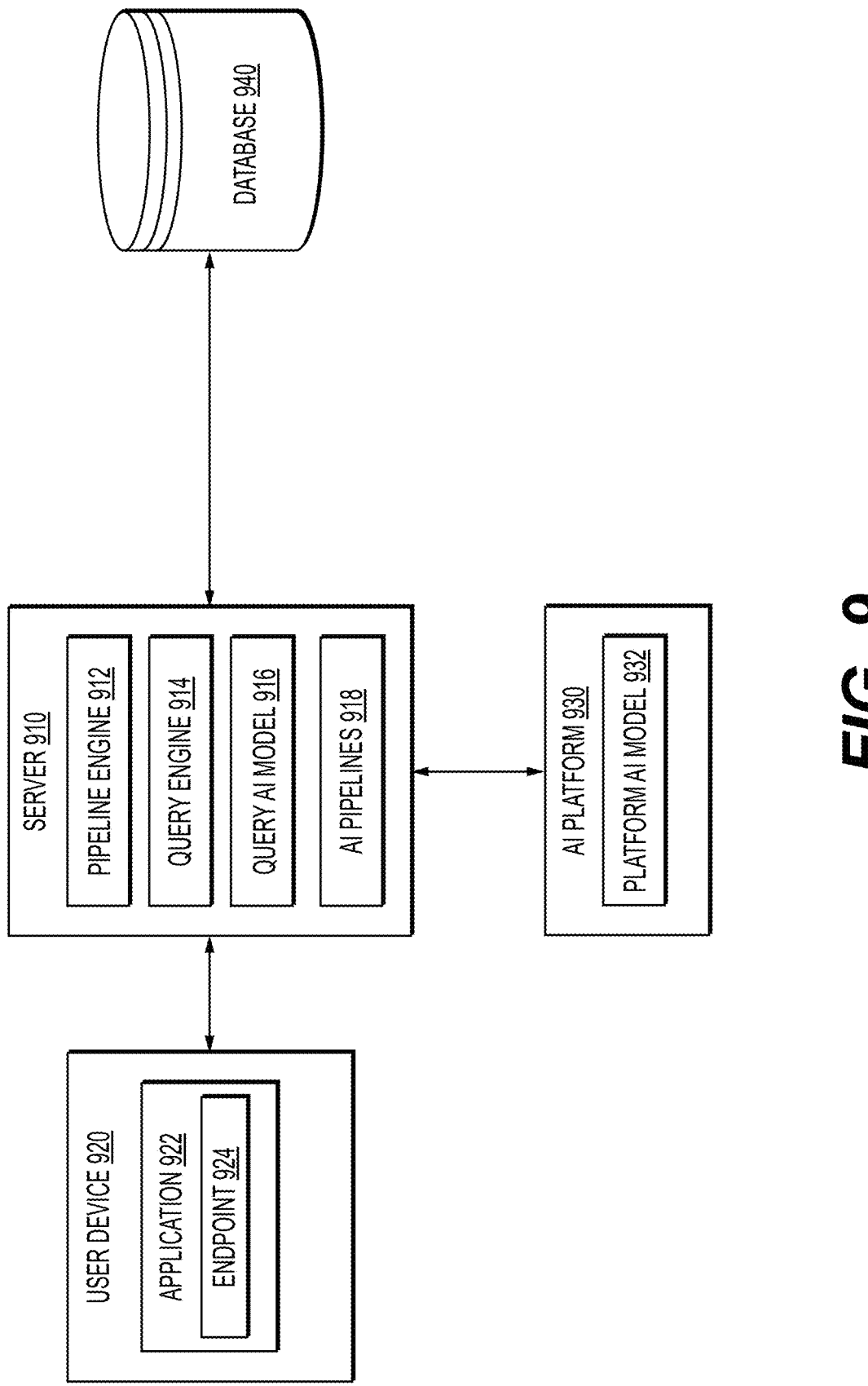
FIG. 9 is an example diagram of system components for identifying and caching potential queries of an AI agent.

FIG. 9 is an example diagram of system components for identifying and caching potential queries of an AI agent. The system comprises a server 910 that manages core data processing, a user device 920 for handling user interactions, and an external AI platform 930 that hosts an AI model 932 for advanced language processing. These components are designed to interact efficiently, ensuring seamless data flow, optimized query handling, and real-time user responses. The user device 920 can be one or more processor-based devices, such as a personal computer, tablet, or cell phone. The processor is hardware-based. The server 910 can be a single server or a group of servers, including multiple servers implemented virtually across multiple computing platforms.

When an AI agent is created, a dataset is uploaded to the server 910, which includes several key components to manage the ingestion and processing of the dataset. Either the execution engine 912 or the execution engine 914 is responsible for chunking the dataset into smaller, contextually relevant units. These chunks are created using a predefined chunking mechanism based on token limits or semantic boundaries, which ensures that each chunk represents a coherent segment of the dataset. Once the chunking process is complete, the execution engine 914 uses an embedding model to generate vector embeddings for each chunk, capturing the semantic meaning of the content. These vectors, along with their associated metadata, are stored in a database 940.

The execution engine 914 is responsible for generating questions that users might ask about each data chunk. To accomplish this, the execution engine 914 sends the chunked data to a query AI model 916, which is designed to generate a set of questions tailored to various user personas, such as technical users, support staff, or end users. The query AI model 916 processes each chunk and generates a variety of potential user questions, which are designed to anticipate the types of inquiries that may arise based on the content of the data. These generated questions are then stored in the database 940 alongside the corresponding data chunks, forming a repository of pre-generated questions that can be retrieved later during user interactions.

The system also incorporates an external AI platform 930, which hosts an AI model 932, such as CHATGPT, to further enhance the response generation process. The AI agent 918 component facilitates the flow of data between the server and the external AI platform 930. Once user queries are submitted, the application 922 interfaces with the AI agent 918 to initiate query handling. The execution engine 912 compares the user's query to the pre-generated question embeddings stored in the database and retrieves the most relevant question and corresponding data chunk. The execution engine then sends this information to the AI model 932 on the AI platform 930 for further processing. The AI model 932 generates a detailed response based on the pre-generated question and data chunk and returns the results to the server 910 for further formatting and transmission.

The database 940 can be one or more vector databases. In one example, the vectorized questions and their corresponding data chunks can be stored within the same database 940, with the data chunks being included as metadata associated with the questions. In another example, the vectorized questions and data chunks can be stored in separate vector databases 940, with a mapping between the two to ensure accurate association and retrieval.

The application 922 on the user device 920 serves as the user interface, allowing users to input queries and receive responses from the AI agent. User queries are sent to the server through an endpoint 924, which directs the queries into the pipeline for processing. Once the query has been matched with a pre-generated question and the corresponding data chunk has been processed by the external AI model 932, the final response is transmitted back to the user's application for display. This system architecture allows for seamless communication between the user device, server, and external AI model, ensuring optimized query handling and delivering contextually relevant responses to users based on pre-generated questions.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for processing user queries based on a dataset associated with an artificial intelligence ("AI") agent, comprising:

dividing content into chunks based on chunking parameters configured for semantic processing;

generating questions for each of a plurality of generated chunks, comprising:

sending the respective chunk and a system prompt to an AI model to cause the AI model to generate questions to which the chunk would be responsive;

vectorizing the generated questions to create question vectors; and storing the question vectors in a first vector database, wherein the question vectors are stored with metadata associating the respective question vector to the respective chunk;

receiving a user query, the user query originating from a user device;

determining which chunks are responsive to the user query by executing a vector-based semantic comparison of the user query against the generated questions, comprising:

vectorizing the user query to create a query vector; and comparing the query vector to the question vectors of the first vector database to identify a question vector that meets a threshold similarity to the query vector;

retrieving the chunk associated with the metadata of the question vector; and synthesizing a result that comprises the retrieved chunk, wherein the result is transmitted back to the user device.

2. The method of claim 1, wherein the chunks are stored in a second database with each chunk having a chunk identifier, and wherein the metadata of the question vectors in the first vector database references the chunk identifiers.

3. The method of claim 2, wherein the second database comprises a vector database.

4. The method of claim 1, wherein the system prompt causes the AI model to create questions relating to each of a plurality of personas, and the plurality of questions received from the AI model comprises questions relating to each of the plurality of personas.

5. The method of claim 4, wherein at least two of the plurality of personas correspond to different user roles.

6. The method of claim 1, further comprising:

causing display of multiple questions at the user device that correspond to question vectors meeting the threshold similarity to the query vector; and receiving a selection of a first question of the multiple questions, wherein the first question corresponds to the question vector, wherein the selection causes the result to comprise the retrieved chunk.

7. The method of claim 1, wherein synthesizing the result comprises:

submitting, to the AI model or a separate AI model, the user query and the retrieved chunk; and receiving at least a portion of the result from the AI model or the separate AI model.

8. The method of claim 1, wherein the threshold similarity comprises a threshold distance or angle measurement to the question vector.

9. The method of claim 1, wherein the threshold similarity comprises matching a role of a user against a role specified by the metadata of the question vector.

10. The method of claim 1, wherein the user query is received at an endpoint associated with the AI agent, and wherein executing the AI agent comprises sending the user query to the AI model.

11. The method of claim 1, further comprising caching a portion of the synthesized result in association with the question vector.

12. The method of claim 11, further comprising retrieving the cached portion of the synthesized result in an instance in which a second query vector is semantically similar to the question vector.

13. The method of claim 12, wherein retrieving the cached portion is contingent on a user credential satisfying an access privilege.

14. The method of claim 1, wherein the metadata comprises an agent execution instruction, wherein the AI agent performs an action specified by the agent execution instruction.

15. The method of claim 14, wherein the action comprises a semantic search of an additional data source.

16. The method of claim 14, wherein the action comprises retrieving search keywords from a specified location.

17. The method of claim 1, wherein the metadata comprises text of the respective chunk.

18. The method of claim 1, wherein the question vector is associated with an access privilege and wherein access to the retrieved chunk is contingent on a user credential satisfying the access privilege.

19. A non-transitory, computer-readable medium containing instructions that, when executed by a hardware-based processor, causes the processor to perform stages for processing user queries based on a dataset associated with an artificial intelligence ("AI") agent, comprising:

dividing content into chunks based on chunking parameters configured for semantic processing;

generating questions for each of a plurality of generated chunks, comprising:

sending the respective chunk and a system prompt to an AI model to cause the AI model to generate questions to which the chunk would be responsive;

vectorizing the generated questions to create question vectors; and storing the question vectors in a first vector database, wherein the question vectors are stored with metadata associating the respective question vector to the respective chunk;

receiving a user query, the user query originating from a user device;

determining which chunks are responsive to the user query by executing a vector-based semantic comparison of the user query against the generated questions, comprising:

vectorizing the user query to create a query vector; and comparing the query vector to the question vectors of the first vector database to identify a question vector that meets a threshold similarity to the query vector;

retrieving the chunk associated with the metadata of the question vector; and synthesizing a result that comprises the retrieved chunk, wherein the result is transmitted back to the user device.

20. A system for processing user queries based on a dataset associated with an artificial intelligence ("AI") agent, comprising:

a memory storage comprising a non-transitory, computer-readable medium comprising instructions; and at least one hardware-based processor that executes the instructions to carry out stages comprising:

dividing content into chunks based on chunking parameters configured for semantic processing;

generating questions for each of a plurality of generated chunks, comprising:

sending the respective chunk and a system prompt to an AI model to cause the AI model to generate questions to which the chunk would be responsive;

vectorizing the generated questions to create question vectors; and storing the question vectors in a first vector database, wherein the question vectors are stored with metadata associating the respective question vector to the respective chunk;

receiving a user query, the user query originating from a user device;

determining which chunks are responsive to the user query by executing a vector-based semantic comparison of the user query against the generated questions, comprising:

vectorizing the user query to create a query vector; and comparing the query vector to the question vectors of the first vector database to identify a question vector that meets a threshold similarity to the query vector;

retrieving the chunk associated with the metadata of the question vector; and synthesizing a result that comprises the retrieved chunk, wherein the result is transmitted back to the user device.

* * * * *